(12) United States Patent
Reza

(10) Patent No.: US 9,276,979 B2
(45) Date of Patent: Mar. 1, 2016

(54) SYSTEM AND METHODS FOR RESILIENT MEDIA STREAMING

(75) Inventor: Areef Reza, Ottawa (CA)

(73) Assignee: VUCLIP (SINGAPORE) PTE. LTD., Singapore (SG)

( * ) Notice: Subject to any disclaimer, the term of this patent is extended or adjusted under 35 U.S.C. 154(b) by 298 days.

(21) Appl. No.: 13/820,431

(22) PCT Filed: Sep. 1, 2011

(86) PCT No.: PCT/CA2011/050533
§ 371 (c)(1),
(2), (4) Date: May 20, 2013

(87) PCT Pub. No.: WO2012/040837
PCT Pub. Date: Apr. 5, 2012

(65) Prior Publication Data
US 2013/0232232 A1  Sep. 5, 2013

Related U.S. Application Data

(60) Provisional application No. 61/379,185, filed on Sep. 1, 2010.

(51) Int. Cl.
G06F 15/16 (2006.01)
H04L 29/06 (2006.01)
H04N 21/44 (2011.01)
H04N 21/6437 (2011.01)

(52) U.S. Cl.
CPC ............ H04L 65/60 (2013.01); H04L 65/4092 (2013.01); H04L 65/608 (2013.01); H04L 65/80 (2013.01); H04N 21/44004 (2013.01); H04N 21/6437 (2013.01)

(58) Field of Classification Search
USPC .................................. 709/219, 227, 246, 235
See application file for complete search history.

(56) References Cited

U.S. PATENT DOCUMENTS

| | | |
|---|---|---|
| 7,080,404 B2 | 7/2006 | Abdo et al. |
| 7,333,808 B2 | 2/2008 | Elkarat et al. |
| 7,340,772 B2 | 3/2008 | Panasyuk et al. |
| 7,383,571 B2 | 6/2008 | Abdo et al. |
| 7,466,986 B2 | 12/2008 | Halcrow et al. |
| 7,469,279 B1 | 12/2008 | Stamler et al. |
| 7,475,421 B2 | 1/2009 | Abdo et al. |
| 7,502,726 B2 | 3/2009 | Panasyuk et al. |
| 7,594,020 B2 | 9/2009 | Apreutesei et al. |
| 7,620,015 B2 | 11/2009 | Lenzarini |

(Continued)

FOREIGN PATENT DOCUMENTS

| | | |
|---|---|---|
| EP | 1089495 | 4/2001 |
| WO | 2006122482 | 11/2006 |

(Continued)

*Primary Examiner* — Jude Jean Gilles

(57) ABSTRACT

A computer implemented method of streaming media on a computing device is disclosed in which a streaming protocol adapter is provided on the computing device for streaming media to a local streaming client on the computing device with enhanced resiliency. The streaming adapter downloads one or more stream files that include the media file formatted for delivery according to a transfer protocol, and also include streaming template transactions for supporting communicating from the streaming adapter to the streaming client. The streaming client may be a standard real-time streaming protocol (RTSP) client, and the streaming adapter may be an RTSP adapter.

37 Claims, 10 Drawing Sheets

(56) References Cited

U.S. PATENT DOCUMENTS

| | | |
|---|---|---|
| 7,664,067 B2 | 2/2010 | Pointer |
| 7,739,391 B2 | 6/2010 | Marais et al. |
| 7,962,947 B2 | 6/2011 | Kulakowski |
| 8,340,711 B1 | 12/2012 | Glass et al. |
| 2002/0073238 A1* | 6/2002 | Doron ............... H04L 29/06 709/246 |
| 2002/0078208 A1 | 6/2002 | Crump et al. |
| 2004/0001476 A1 | 1/2004 | Islam et al. |
| 2004/0049797 A1 | 3/2004 | Salmonsen |
| 2004/0098748 A1* | 5/2004 | Bo et al. ................. 725/105 |
| 2005/0198363 A1 | 9/2005 | Ling et al. |
| 2005/0198379 A1 | 9/2005 | Panasyuk et al. |
| 2005/0267974 A1 | 12/2005 | Panasyuk et al. |
| 2005/0273513 A1 | 12/2005 | Panasyuk et al. |
| 2006/0023729 A1* | 2/2006 | Choi et al. .................. 370/428 |
| 2006/0063560 A1 | 3/2006 | Herle |
| 2006/0217112 A1 | 9/2006 | Mo |
| 2007/0038759 A1 | 2/2007 | Hanson et al. |
| 2007/0060122 A1 | 3/2007 | Tang et al. |
| 2007/0112965 A1 | 5/2007 | Eftis et al. |
| 2007/0299936 A1* | 12/2007 | Borgendale et al. ......... 709/219 |
| 2007/0299973 A1* | 12/2007 | Borgendale ............ G06F 9/546 709/227 |
| 2007/0300233 A1* | 12/2007 | Bhogal et al. ................. 719/313 |
| 2007/0300234 A1* | 12/2007 | Dekel et al. .................. 719/313 |
| 2007/0300235 A1* | 12/2007 | Dekel et al. .................. 719/313 |
| 2008/0010487 A1* | 1/2008 | Dekel et al. ...................... 714/4 |
| 2008/0043685 A1* | 2/2008 | Sandblom ........ H04M 1/72527 370/338 |
| 2008/0141275 A1* | 6/2008 | Borgendale ............ G06F 9/541 719/313 |
| 2008/0141276 A1* | 6/2008 | Borgendale ............ G06F 9/546 719/313 |
| 2009/0077243 A1 | 3/2009 | Garg et al. |
| 2009/0235170 A1* | 9/2009 | Golden .................... G06F 3/14 715/719 |
| 2009/0278705 A1 | 11/2009 | Chhabra et al. |
| 2009/0282162 A1 | 11/2009 | Mehrotra et al. |
| 2009/0305666 A1 | 12/2009 | Tian et al. |

FOREIGN PATENT DOCUMENTS

| | | |
|---|---|---|
| WO | 2008011388 | 1/2008 |
| WO | 2008021547 | 2/2008 |
| WO | 2008088711 | 7/2008 |
| WO | 2010076732 | 7/2010 |

\* cited by examiner

SYSTEM AND METHODS FOR RESILIENT MEDIA STREAMING

CROSS-REFERENCE TO RELATED APPLICATION

This application is a National Phase application claiming the benefit of No. PCT/CA2011/050533 filed on Sep. 1, 2011, in English, which further claims priority to U.S. Provisional Application No. 61/379,185, titled "SYSTEMS AND METHODS FOR RESILIENT MEDIA STREAMING" and filed on Sep. 1, 2010, the entire contents of which are incorporated herein by reference.

BACKGROUND

This disclosure relates to systems and methods for streaming media content, and more particularly, this disclosure relates to systems and methods for resiliently streaming media from a server to a mobile computing device over a wireless network.

Mobile applications that employ wireless networks for connecting with one or more server entities face multiple challenges. For example, the underlying wireless transport network is likely to fail more often than when connecting over wired networks, and thus the assumption that network connections will remain connected most of the time is generally not true for mobile applications. As a result, applications designed with such assumptions (such as traditional software applications) do not yield a good quality of experience for end users running applications on mobile devices.

While smartphones are often equipped with platforms that support advanced application programming interfaces (APIs) for streaming media content, some mobile devices and embedded systems, such as feature phones, are often provided with relatively simple APIs that are restricted in functionality. In particular, many mobile devices are designed to operate on the Java Micro Edition (Java ME or J2ME) Platform and the entry level Symbian platform, which often restricts media streaming applications to applications that require a continuous connection between the computing device and a remote server.

Such devices (and many server applications such as web services, video streaming servers, and file transfer protocol FTP servers) are session based, and are not designed for mobile client applications that may get disconnected during a data or media streaming session. A disconnection typically requires the client application to start afresh, which is highly undesirable from a user perspective, particularly when streaming media content.

Media content may be streamed to a mobile client using the Real Time Streaming Protocol (RTSP), which is often supported by feature phones operating on the J2ME platform and most smart phones. RTSP is an application-level protocol for control over the delivery of data with real-time properties. RTSP provides an extensible framework to enable controlled, on-demand delivery of real-time data, such as audio and video. Sources of data can include both live data feeds and stored data such as media files. This protocol is intended to control multiple data delivery sessions, provide a means for choosing delivery channels such as User Datagram Protocol (UDP), multicast UDP and Transport Control Protocol (TCP), and provide a means for choosing delivery mechanisms based upon various streaming protocols, such as RTP (as defined in RFC 1889). This protocol requires a steady network connection between the client and the server. Network disconnections can prematurely interrupt and stop a media session, resulting in a poor quality of experience for the user. Therefore, while some solutions exist for streaming media to mobile devices with moderate computing power such as feature phones, or to smart phones under low-speed network conditions, the session-based nature of the existing streaming solutions often leads to poor playback and user experience.

SUMMARY

A computer implemented method of streaming media on a computing device is disclosed in which a streaming protocol adapter is provided on the computing device for streaming media to a local streaming client on the computing device with enhanced resiliency. The streaming adapter downloads one or more stream files that include the media file formatted for delivery according to a transfer protocol, and also include streaming template transactions for supporting communicating from the streaming adapter to the streaming client. The streaming client may be a standard real-time streaming protocol (RTSP) client, and the streaming adapter may be an RTSP adapter.

Accordingly, in a first aspect, there is provided a computer implemented method of streaming media on a computing device, the computing device including a streaming client, the method comprising the steps of: identifying a local streaming adapter and a selected media file for playback on the computing device; sending a request from the streaming client to the local streaming adapter for playback of the selected media file, identifying a location of one or more stream files on a remote server, wherein the one or more stream files includes the selected media file formatted for delivery according to a transfer protocol and further includes streaming template transactions for supporting communicating from the local streaming adapter to the streaming client; downloading the one or more stream files to the local streaming adapter; and streaming the selected media file from the local streaming adapter to the streaming client, wherein streaming transactions sent from the local streaming adapter to the streaming client are obtained from the streaming template transactions.

In another aspect, there is provided a method of transcoding a media file for use in locally streaming the media file between a local streaming adapter and a streaming client, wherein the local streaming adapter and the streaming client reside on a computing device, the method comprising the steps of: transcoding the media file for transport according to a transfer protocol, thereby obtaining a transcoded media file; generating streaming protocol template transactions for supporting communicating from the local streaming adapter to the streaming client, wherein the streaming protocol template transactions include transactions that would be sent from a streaming sever to the streaming client under ideal network conditions; and storing the transcoded media file and the streaming protocol template transactions on a server, wherein the transcoded media file and the streaming protocol template transactions are made available for downloading by the local streaming adapter.

In another aspect, there is provided a computer-readable storage medium comprising instructions for locally streaming a media file on a computing device, wherein execution of the instructions by one or more processors of the computing device causes the one or more processors to carry out the steps of: identifying a local streaming adapter and a selected media file for playback on the computing device; sending a request from a streaming client to the local streaming adapter for playback of the selected media file, identifying a location of one or more stream files on a remote server, wherein the one or more stream files includes the selected media file formatted for delivery according to a transfer protocol and further includes streaming template transactions for supporting communicating from the local streaming adapter to the streaming client; downloading the one or more stream files to the local streaming adapter; and streaming the selected media file from the local streaming adapter to the streaming client, wherein streaming transactions sent from the local streaming adapter to the streaming client are obtained from the streaming template transactions.

In another aspect, there is provided a computer implemented method of connecting a first computing device and a second computing device such that an application running on the first computing device perceives the connection as being resilient, the method comprising the steps of: receiving, on the first computing device, a request from the application to create a connection between the first computing device and the second computing device; creating a local endpoint socket on the first computing device, such that a first connection is formed between a socket on the first computing device and the local endpoint socket via a loopback connection; redirecting the request to the local endpoint socket; establishing a second connection between the local endpoint socket and the second computing device according to the request; monitoring the second connection; and in the event of a disconnection of the second connection, reconnecting second connection.

In another aspect, there is provided a computer-readable storage medium comprising instructions for connecting a first computing device and a second computing device such that an application running on the first computing device perceives the connection as being resilient, wherein execution of the instructions by one or more processors of the computing device causes the one or more processors to carry out the steps of: receiving, on the first computing device, a request from the application to create a connection between the first computing device and the second computing device; creating a local endpoint socket on the first computing device, such that a first connection is formed between a socket on the first computing device and the local endpoint socket via a loopback connection; redirecting the request to the local endpoint socket; establishing a second connection between the local endpoint socket and the second computing device according to the request; monitoring the second connection; and in the event of a disconnection of the second connection, reconnecting second connection.

In another aspect, there is provided a computer implemented method of transferring a file from a server to a computing device, the server including an application adapter maintaining a local loopback connection within the server, the method comprising the steps of: receiving, at the application adapter, a request from the computing device to transfer the file; providing the request to the server and initiating the transfer of the file from the server to the client application; monitoring the connection between the application adapter and computing device; in the event of a disconnection of the connection, caching a response from the server; and upon reconnection of the connection between the application adapter and the computing device, retrieving the cached portion of the file and resuming the transfer of the file.

In another aspect, there is provided a computer-readable storage medium comprising instructions for transferring a file from a server to a computing device, the server including an application adapter maintaining a local loopback connection within the server, wherein execution of the instructions by one or more processors of the computing device causes the one or more processors to carry out the steps of: receiving, at the application adapter, a request from the computing device to transfer the file; providing the request to the server and initiating the transfer of the file from the server to the client application; monitoring the connection between the application adapter and computing device; in the event of a disconnection of the connection, caching a response from the server; and upon reconnection of the connection between the application adapter and the computing device, retrieving the cached portion of the file and resuming the transfer of the file.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Figure 1:
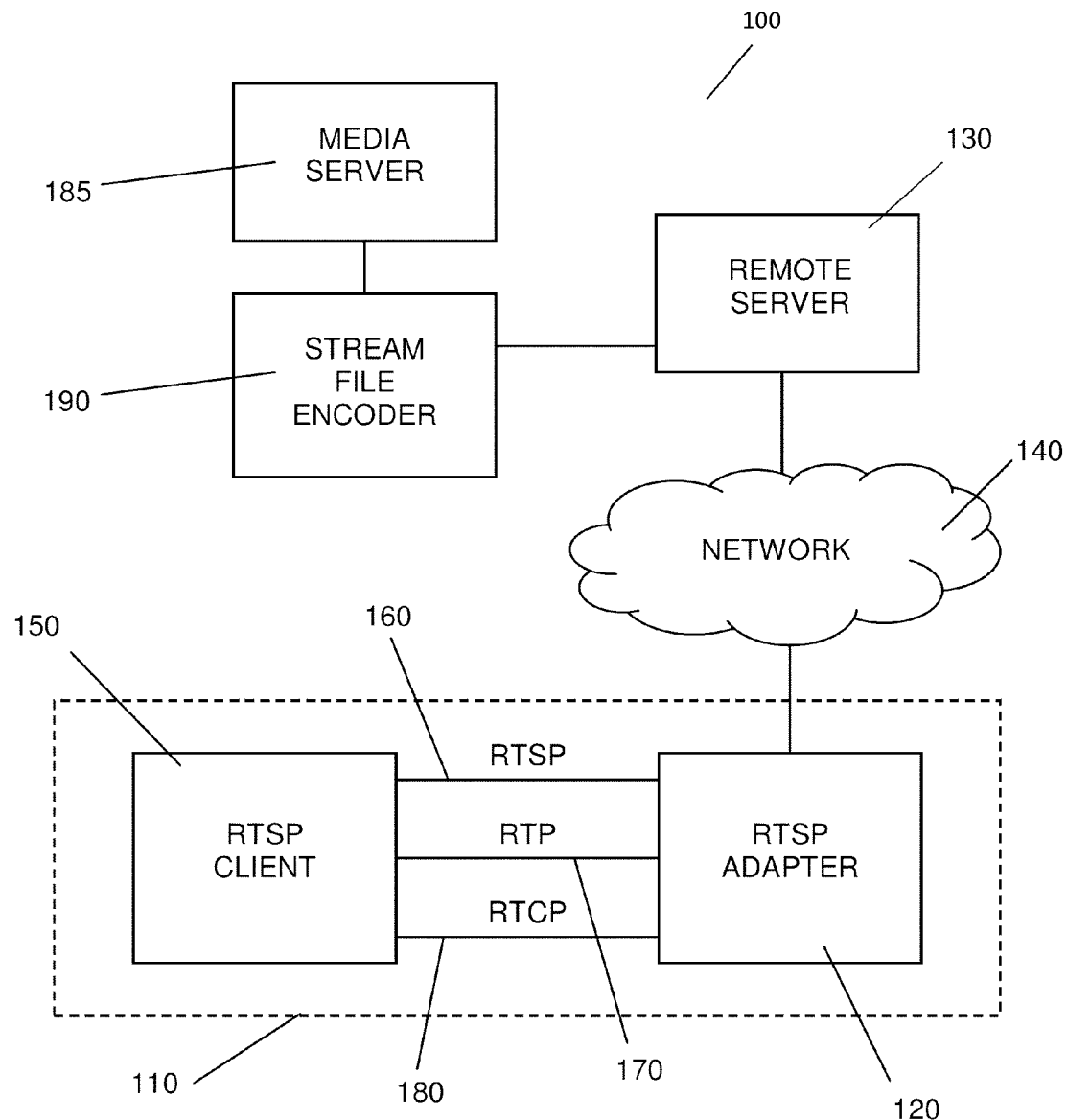
FIG. 1 illustrates a system for streaming media to a computing device in which the media is locally streamed using an RTSP adapter residing on the computing device.

FIG. 1 illustrates a resilient RTSP streaming system 100 for delivering streaming media to a computing device 110 in which the RTSP protocol is used to locally stream a downloaded file to the computing device. As shown in the Figure, a resilient RTSP adapter 120 is provided as a software application on computing device 110 for downloading a media file from a remote web server 130 over a network 140 and locally streaming the media file to an RTSP client 150 on the computing device 110.

Unlike conventional streaming systems involving a remote RTSP server and an RTSP client, the present embodiment incorporates the RTSP adapter 120 and the RTSP client 150 locally on a computing device. The RTSP client 150 and RTSP adapter 120 communicate using a standard RTSP channel 160 and streaming data is delivered via a standard real time transport protocol such as RTP, shown in the Figure as RTP channel 170.

Media files, such as encoded video files, may be stored on the remote media server 185. As described in more detail below, a media encoder 190 processes the media files and generates a stream file to be downloaded by the RTSP adapter 120 running on the computing device.

Figure 3:
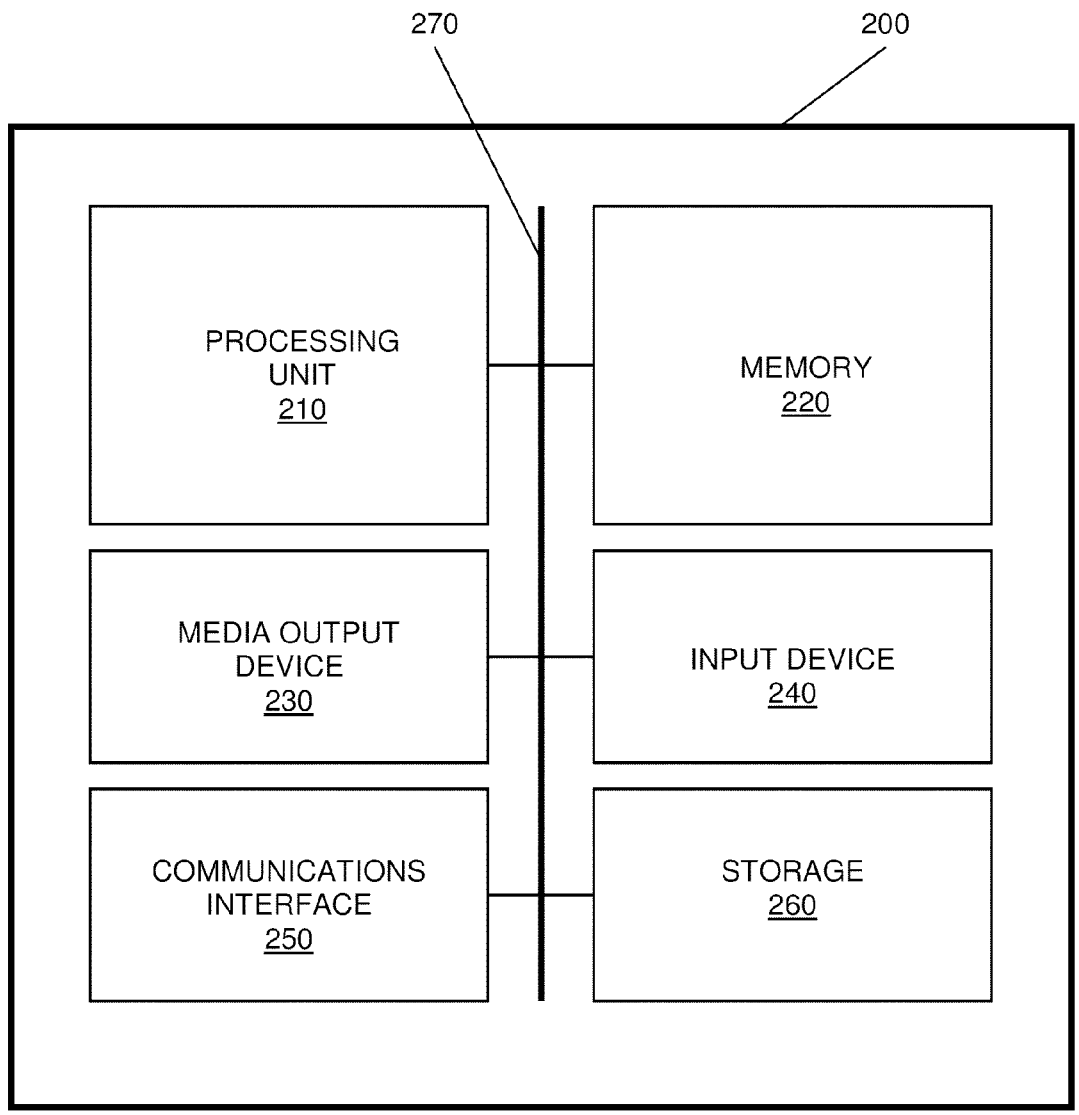
FIG. 3 is a block diagram illustrating an example of a computing device.

FIG. 3 illustrates an example of a computing device 200 for implementing various embodiments disclosed herein. The present illustration is not intended to suggest any limitation as to scope of use or functionality, as the systems and methods may be implemented in diverse general-purpose or special purpose computing environments. In some example implementations, computing device 200 may be a mobile computing device capable of media playback, such as a feature phone, a smart phone, a tablet, a netbook, and a laptop computer.

Computing device 200 includes at least one processing unit 210 and memory 220. Processing unit 210 executes computer-executable instructions and may include one or more processors. In a multi-processing system, multiple processors execute computer-executable instructions for increased processing power. Memory 210 may be volatile memory (e.g., registers, cache, RAM), non-volatile memory (e.g., ROM, EEPROM, flash memory, etc.), or a combination thereof. Software is stored in memory 210 for implementing the methods described in the proceeding embodiments.

Computing device 200 may include additional components. Computing device 200 may include one or more media output devices 230, one or more input devices 240, and one or more communication interfaces or connections 250. Computing device 200 may further include a storage unit or apparatus 260, which may be removable or non-removable. For example, storage unit or apparatus 260 may include magnetic disks, magnetic tapes or cassettes, CD-ROMs, DVDs, or any other medium which can be used to store information and which can be accessed within the computing device 200.

An interconnection mechanism interconnects the components of the computing device. An example interconnection mechanism is shown as bus 270. Typically, operating system software such as J2ME (not shown) provides an operating environment for other software (e.g. APIs) executing in the computing device 200, and coordinates activities of the components of the computing device 200.

Media output device 230 may be a display, speaker or another media device that provides media output from the computing device 200. Input device 230 may be a touch input device such as a keyboard, mouse, pen, or trackball, a voice input device, a scanning device, or another device that provides input to the computing device 200.

Communication interface 250 enables communication over a communication medium to another computing entity, such as remote server 130 in FIG. 1. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The systems and methods can be described in the general context of computer-readable media. Computer-readable media are any available media that can be accessed within a computing environment. By way of example, and not limitation, with the computing device 200, computer-readable media may include memory 220, storage unit or apparatus 260, communication media, and combinations of any of the above.

The systems and methods can be described in the general context of computer-executable instructions, such as those included in program modules, being executed in a computing environment on a target real or virtual processor. Generally, program modules include routines, programs, application programming interfaces, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

Figure 4:
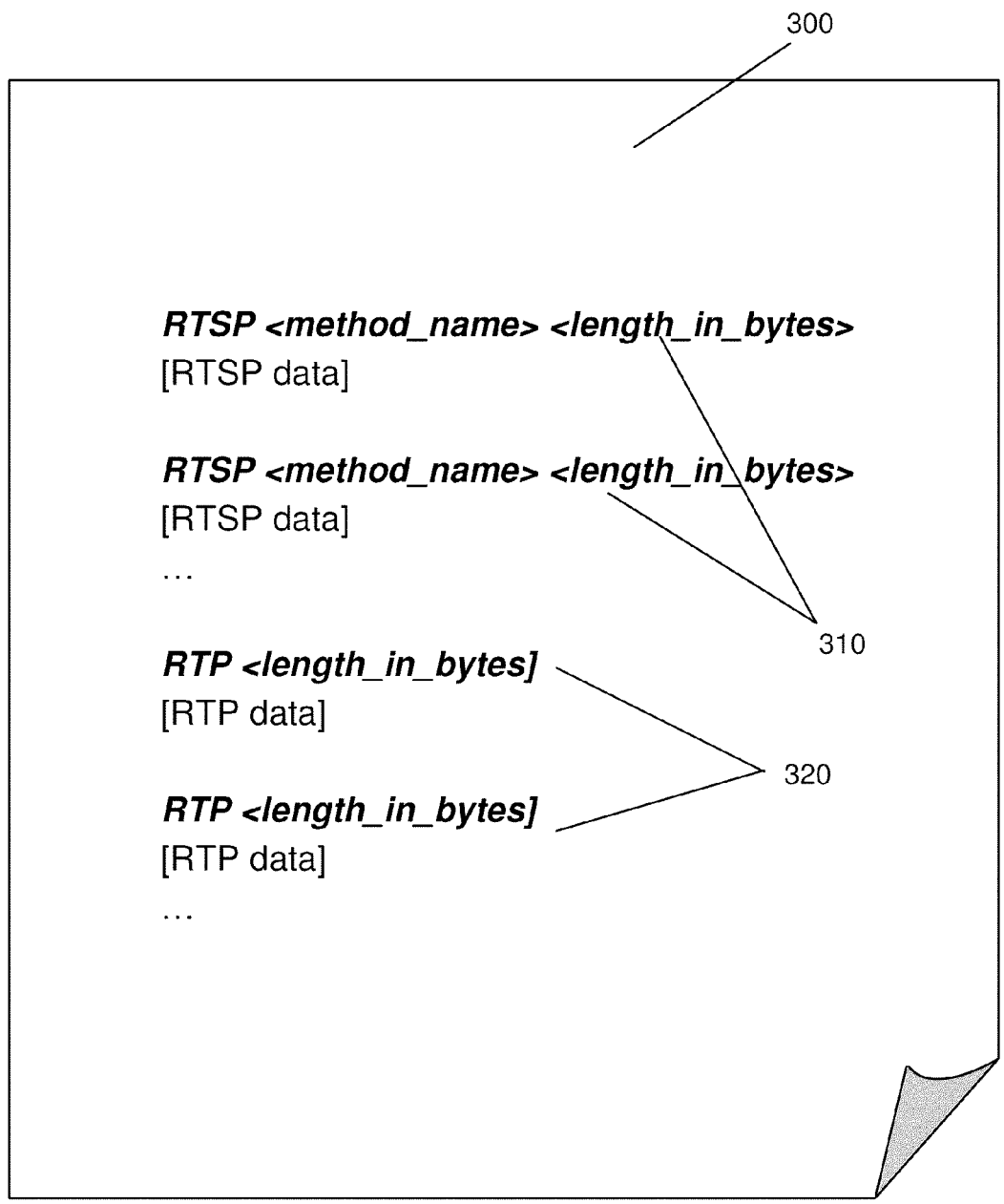
FIG. 4 provides a schematic form of a stream file that is stored on a remote server.

Referring again to FIG. 1, the stream file encoder 190 converts the media file into a stream file containing a sequence of RTSP template transactions and RTP transactions that would be provided by a standard RTSP server under perfect network conditions, e.g. network conditions that are absent of discernable quality of service degradations. The content of the stream file 300 is schematically illustrated in FIG. 4, which shows a generic example format of such a file (the header in this example file is show in bold text). Stream file 300 includes one or more RTSP transactions 310, followed by one or more RTP transactions 320 including the media content.

The RTSP adapter 120 downloads the stream file and uses its content sequentially to communicate with RTSP client 150. RTSP adapter 120 reads the responses from the stream file in the forward direction and moves its read pointer past the last response read. Every RTSP request issued by RTSP client 150 is matched with the first RTSP response available in the stream file. Once matched, next match is determined starting from the end of last response read. Accordingly, RTSP 150 client perceives that it is communicating with an RTSP server instead of local RTSP adapter 120.

The stream file is stored on remote server 130 for downloading by local RTSP adapter 120. Remote server 130 may be any server capable of providing the stream file, including, but not limited to, a web server and file transfer protocol (FTP) server. Alternatively, media server 185, stream file encoder 190, and remote server 130 may be provided as a single remote server. In another embodiment, the stream file, once encoded by stream file encoder 190, may be distributed to one or more proxy servers, caching servers, or servers in a content delivery network.

Figure 2:
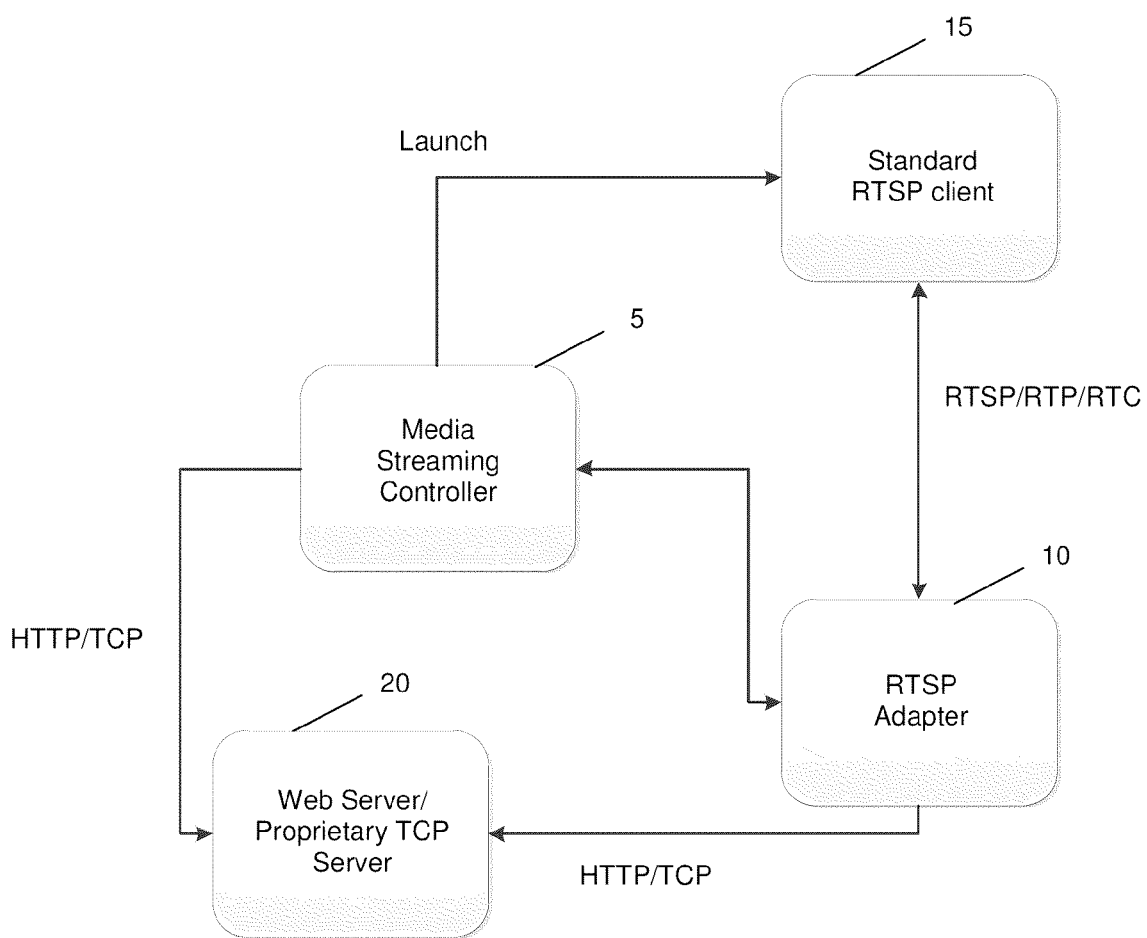
FIG. 2 is a block diagram illustrating an embodiment in which a Media Controller is included in the system.

Referring now to FIG. 2, a block diagram is provided illustrating an example system for streaming media in which media streaming controller 5 is provided for interacting with a user operating the computing device and providing media content and location information to the RTSP adapter 10. The system further includes a standard RTSP client 15, and a remote server 20, as described above. The remote server 20 can be a standard web server or a proprietary server. It noted that in this example, only the server resides remotely, while all other components reside on the computing device (which may be, for example, a mobile device). In this example, media streaming controller 5 interacts with the user (for example, via a user interface provided on the computing device) and presents a number of media files that are available to be streamed.

Media Streaming Controller 5 obtains this list of media files from remote Server 20. Media Streaming Controller 5 can be configured to connect with a specific remote server 20 or a user may choose to provide an address of the remote server. The list of media files contains a file reference, such as a remote URL, that indicates the location of the stream file on server 20. When a user chooses to stream one of the media files, media streaming controller 5 contacts RTSP adapter 10 and requests that it to configure a local port for a standard RTSP session with the local standard RTSP client 15 and also indicates the location of remote server 20. Media streaming controller 5 then launches local standard RTSP client 15 and passes a standard RTSP link that points to the local port configured with RTSP adapter 10. An example of such a local RTSP URL could be rtsp://127.0.0.1:7689/video_3679.3gp. In this example, the RTSP adapter 10 is listening on local port 7689 and acts as an RTSP server to standard RTSP client 15.

A specific example of a stream file is shown below. A brief explanation of each portion of the file is provided in italicized form for each separate section of the file defined by a header.

The following section below provides an example template for an RTSP response that the RTSP adapter will send as a response to a client's first "RTSP DESCRIBE" request.

---

RTSP DESCRIBE 421 RTSP/1.0 200 OK
Server: DSS/5.5.5 (Build/489.16; Platform/Win32; Release/Darwin; state/beta; )
Cseq: 2
Last-Modified: Fri, 08 Jun 2007 19:43:22 GMT
Cache-Control: must-revalidate
Content-length: 627
Date: Fri, 08 Jun 2007 19:44:37 GMT
Expires: Fri, 08 Jun 2007 19:44:37 GMT
Content-Type: application/sdp
x-Accept-Retransmit: our-retransmit
x-Accept-Dynamic-Rate: 1
Content-Base: rtsp://192.168.1.101/q.3gp/

---

The following provides an example template for an RTSP response that the RTSP adapter will send as a response to a client's second "RTSP DESCRIBE" request. In this example, an RTSP client issues two DESCRIBE requests; the first response from the adapter indicates the presentation description is in Session Description Protocol (SDP); the second response provides the SDP response.

---

RTSP DESCRIBE 197
v=0
o=StreamingServer 3390320674 1181331802000 IN IP4 192.168.1.101
s=\q.3gp
u=http:///
e=admin@
c=IN IP4 0.0.0.0
b=AS:70
t=0 0
a=control:*
a=maxprate:21.000000
a=range:npt=0- 349.60000
RTSP DESCRIBE 430
m=video 0 RTP/AVP 96
b=AS:26
b=AS:24
a=maxprate:15
a=rtpmap:96 MP4V-ES/90000
a=control:trackID=3
a=cliprect:0,0,144,176
a=framesize:96 176-144
a=fmtp:96 profile-level-id=1;config=000001B008000001B50EE040C0CF00000100000001200084 40FA282C2090A31F
 m=audio 0 RTP/AVP 97
 b=AS:12
 b=AS:9
 a=maxprate:21
 a=rtpmap:97 MP4A-LATM/22050/1
 a=control:trackID=4
 a=fmtp:97 profile-level-id=15;object=2;cpresent=0; config=400027103FC0
RTSP SETUP 407
RTSP/1.0 200 OK
 Server: DSS/5.5.5 (Build/489.16; Platform/Win32; Release/Darwin; state/beta; )
 Cseq: 3
 Last-Modified: Fri, 08 Jun 2007 19:43:22 GMT
 Cache-Control: must-revalidate
 Session: 14057427978270
 Date: Fri, 08 Jun 2007 19:44:37 GMT
 Expires: Fri, 08 Jun 2007 19:44:37 GMT
 Transport: RTP/AVP;unicast;mode=play;source=192.168.1.101;client_port=24824-24825;server_port=6970-6971;ssrc=00000709

---

The following provides an example template for adapter's response to a client's RTSP SETUP request. A RTSP SETUP request/response negotiates how media stream is to be transported.

---

RTSP SETUP 407
RTSP/1.0 200 OK
 Server: DSS/5.5.5 (Build/489.16; Platform/Win32; Release/Darwin; state/beta; )
 Cseq: 4
 Session: 14057427978270
 Last-Modified: Fri, 08 Jun 2007 19:43:22 GMT
 Cache-Control: must-revalidate
 Date: Fri, 08 Jun 2007 19:44:37 GMT
 Expires: Fri, 08 Jun 2007 19:44:37 GMT
 Transport: RTP/AVP;unicast;mode=play;source=192.168.1.101;client_port=16804-16805;server_port=6970-6971;ssrc=00004011

---

The following provides an example template for the adapter's response to the client's RTSP PLAY request. An RTSP PLAY causes media streams to be played.

---

RTSP PLAY 303
RTSP/1.0 200 OK
 Server: DSS/5.5.5 (Build/489.16; Platform/Win32; Release/Darwin; state/beta; )
 Cseq: 5

```
Session: 14057427978270
Range: npt=0.00000-349.60000
RTP-Info:
url=rtsp://192.168.1.101/q.3gp/trackID=3;seq=26810;rtptime=27175,
url=rtsp://192.168.1.101/q.3gp/trackID=4;seq=6241;rtptime=23464
```

The following are examples of blocks of RTP data that are included in the stream file. The RTSP adapter will feed this RTP data to the client in the same manner as an RTSP server.

```
RTP 17
[17 bytes of binary RTP data]
RTP 1024
[1024 bytes of binary RTP data]
....
```

As shown in FIG. 1, an RTSP based streaming solution makes use of three separate protocols: RTSP for negotiating a streaming session with the server; RTP for packetizing and delivering the actual media content (e.g. audio and/or video information); and RTCP for monitoring ongoing RTP sessions. Connections between RTSP adapter 120 and RTSP client 150 are provided directly within the computing device, since both applications are operating on a common computing platform (such as the J2ME platform). As a result of the local implementation of the RTSP adapter and RTSP client, there are no inherent QoS issues related to the local RTSP transport. Despite the lack of need for QoS monitoring, a standard RTCP channel is employed so that the standard RTSP client provided on the computing device perceives a standard connection with an RTSP server rather than the local RTSP adapter 120.

Figure 5:
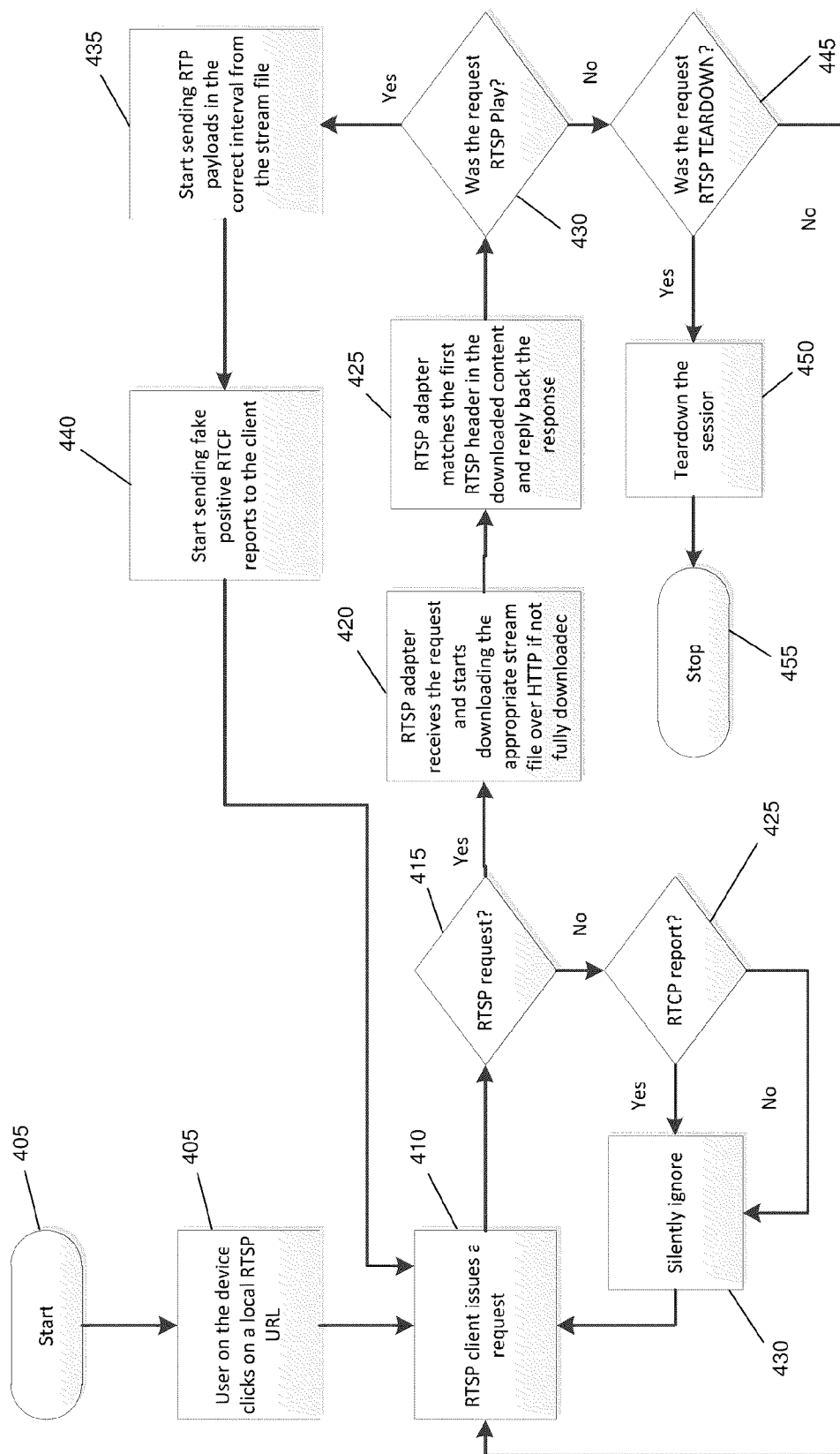
FIG. 5 is a flow chart illustrating a method of providing a media file to a computing device and locally streaming the media on computing device using a local RTSP adapter and an RTSP client.

The system described above is employed to stream media content on a local computing device, where the RTSP adapter 120 running locally behaves like a local RTSP server. The following section describes a method for streaming media content according in one example implementation, with reference to FIG. 5.

Initially, the RTSP client application running on the computing device is provided with an RTSP link for playback that points via a URL to the local RTSP adapter. A list of media that contains such RTSP links is provided by the server. Each of these links points to the local device. RTSP adapter may then use the filename of such an RTSP link to determine the actual remote stream file. An example link is:

rtsp://127.0.0.1/video_3456.3gp.

The filename portion of the local RTSP URL is mapped by the RTSP adapter to identify the actual location of the remote stream file. There are many ways of achieving this mapping. In one embodiment, the filename in the local RTSP URL is combined with a known base HTTP URL to determine the remote stream file location. For example, local RTSP link shown above can be mapped to the URL http://www.mycompany.com/store/video_3456.stream for locating the stream file on the remote server.

In step 405, a user operating the computing device selects the URL. The standard RTSP client issues an RTSP request at step 410, which is sent to the RTSP adapter to stream the given RTSP URL (pointing to the local RTSP adapter).

Provided that the request is an RTSP request (see step 415), the RTSP adapter proceeds by identifying the remote stream file by looking up the given URL. This may be achieved as shown in FIG. 2, where a Media Streaming Controller has been employed to present a list of media files available for streaming to the user, and where the Media Streaming Controller further provides this list to the RTSP adapter along with the location, on the remote server, of the stream file corresponding to each media file. As shown in step 420, the RTSP adapter then communicates with the remote server via the URL and subsequently begins downloading the stream file over HTTP. If, on the other hand, the client request was a RTCP report, or any other form of communication, the RTSP adapter silently ignores the request, as shown in steps 425 and 430. RTCP requests may be ignored since QoS will not be degraded over such a local and direct connection.

The RTSP adapter may buffer the downloaded media file, and once the RTSP adapter has downloaded a sufficient portion of the stream file, it begins responding to the standard RTSP client. In one embodiment, the RTSP adapter waits until at least one block of RTP data has been received. In another embodiment, a smart buffering method is performed. The adapter first measures the current data rate and determines the total length of the stream file (which can be obtained from the server based on the list of media files). The adapter then determines the play time of the entire stream file, for example, using the information provided in the RTSP DESCRIBE response. The adapter then determines the minimum number of bytes that are to be downloaded so that the remaining portion of the steam file can be downloaded within the play time.

The response is selected by matching the RTSP protocol request from the RTSP client based on the sequential ordering of the headers (the transactions) in the downloaded stream file, as shown in step 425. The RTSP adapter thus simply provides the response based on its RTSP template transactions within from the stream file. It is noted that step 425 refers to all RTSP headers, including DESCRIBE, SETUP, PLAY, PAUSE, and TEARDOWN requests.

The RTSP adapter accepts RTSP requests until it receives an RTSP PLAY request, after which it starts sending RTP data to RTSP client. Referring now to step 430, if the RTSP protocol request based on the first header of the stream file is RTSP PLAY, then the adapter responds by sending the RTP payloads contained within the stream file to the appropriate local port of the standard RTSP client, as indicated in step 435. As shown in step 440, the RTSP adapter will also open up local ports for RTCP, and provide RTCP responses to the RTSP client. However the adapter will always indicate a good network condition and QoS via the RTCP reports.

As shown in step 445, if the request was neither RTSP PLAY nor RTSP TEARDOWN, then step 410 is repeated and the adapter accepts additional RTSP requests from the RTSP client. Notably, only the RTSP portion of the protocol is request/response based. The RTSP client need not issue requests after the RTSP PLAY request is made, during the time interval over which the media file is streamed according to RTP. Accordingly, the RTSP adapter spontaneously sends RTP data to the RTSP client after an RTSP PLAY request is made. The next RTSP request originating from the RTSP client may be RTSP PAUSE or TEARDOWN. Both of these requests are handled by the RTSP adapter without consulting the stream file, as per the RTSP protocol.

If, as shown in step 445, the RTSP request is RTSP teardown, the RTSP adapter tears down the RTSP session in step 450 and the session is stopped in step 455.

Locally streaming the media file on the computing device solves a number of problems associated with media delivery, especially with the delivery is provided over a wireless network. Most importantly, by locally streaming the media file, disconnections or variability in the network do not affect the ongoing local RTSP session. As a result, the RTSP connection is not broken during the playback of a media file when a temporary network disconnection occurs, and the user is not forced to re-establish the connection.

In one embodiment, the device running the RTSP client and RTSP adapter can pre-buffer a sufficient quantity of media data based on the current data rate for an uninterrupted streaming experience.

A benefit of the system and method disclosed above is that there is no need for a traditional RTSP server. For example, the media to be streamed can be delivered as files over HTTP by a traditional HTTP server. This can significantly improve the server scalability, since the stream file may be delivered over Content Data Networks (CDN) such as Akamai or Amazon Cloud Front.

Furthermore, as noted above, a standard RTSP client can be used as the media player on the computing device, which enables all RTSP capable devices to play media resiliently, even over very poor network connections. This is of particular importance to simpler media devices that include standard RTSP clients, such as feature phones, and to more powerful media devices that are forced to operate under low-speed networks such as 2.5G or 2.75G.

The stream file can be delivered by a wide range of delivery technologies. In particular, the streaming RTSP adapter need only implement the client portion of the delivery technology. For example, for HTTP transfer, the RTSP adapter implements the HTTP client functionality; while for FTP, the RTSP adapter implements the FTP client functionality.

It is to be understood that the scope of the embodiments described above is not intended to be limited to RTSP as a streaming protocol. Any streaming protocol involving communications between a client and a server can be used in this technique, where the server is effectively replaced by a local adapter that mimics the communication of the server. The adapter would obviously be different for different streaming protocols. One non-limiting example of an alternative streaming protocol that may be employed is the real time messaging protocol (RTMP). Furthermore, the scope of the embodiments is not limited to RTP as a transfer protocol.

Furthermore, the stream file containing the streaming protocol template transactions and the media file encoded according to a transfer protocol may be provided as multiple files that the adapter may download, as opposed to a single file as described above. In one embodiment, the streaming protocol transactions are provided in one or more transaction files, and the transport protocol transactions are provided in a transport file. In one embodiment, the one or more transaction files may be downloaded in advance or provided to the adapter in advance of the issuing of a transaction request by the streaming client.

In another embodiment, additional resiliency is provided for the preceding embodiments by improving the resiliency in the application layer of the OSI protocol stack. This allows one to employ the aforementioned methods without requiring any network infrastructure changes. A socket is a well known connection mechanism for client server applications. All operating systems (both desktop and mobile) provide an API and library to use sockets for the development of client-server applications.

This embodiment provides a resilient socket for use in mobile applications, which exposes the same API to client applications to use, but provides some extra functionality not available on conventional sockets. A resilient socket provides the following features. Most importantly, a resilient socket automatically and transparently reconnects with a server upon disconnection due to network failure. Additionally, a resilient socket automatically and transparently switches from one network to another (e.g., from cellular to WiFi) if one becomes available, and will optionally intelligently instigate a query for searching any available network connections (e.g., WiFi). Accordingly, a resilient socket provides the benefit of giving the impression that its connectivity with the server has never gone down during a disconnection event, which allows a client application using a resilient socket to be oblivious to network problems. As further described below, a client application requiring the use of a resilient socket invokes a resilient socket API to configure a local socket end point (a local IP address and a port) for communicating with a remote server.

Figure 6:
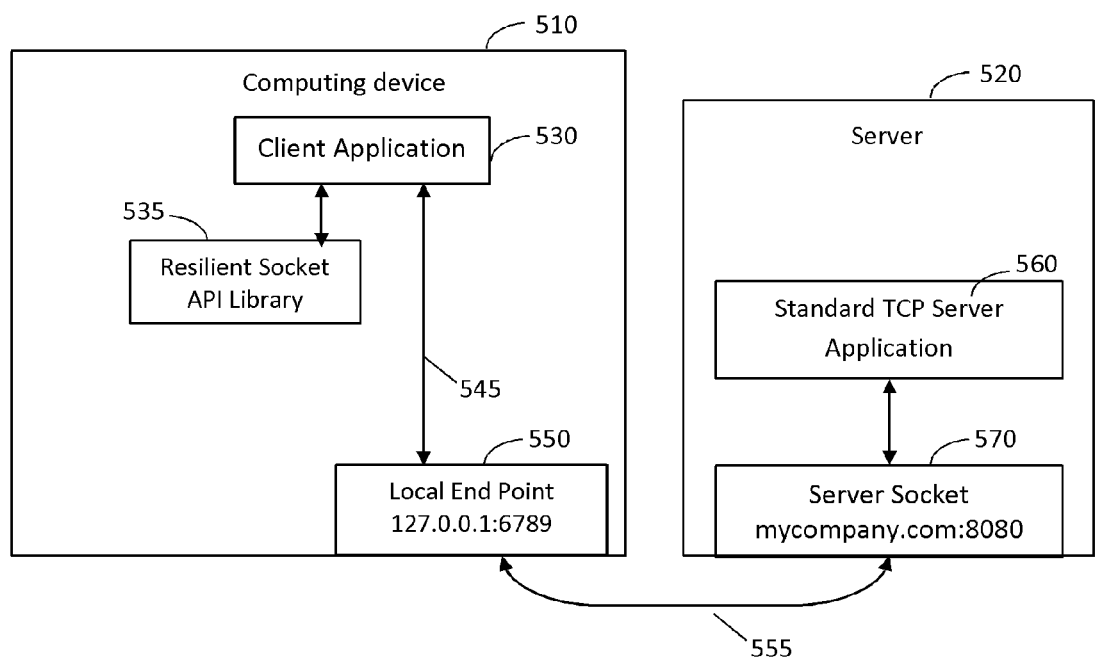
FIG. 6 provides an illustration of an example implementation of a resilient socket.

FIG. 6 provides a schematic of a client/server system in which computing device 510 implements a resilient socket for communication with server 520. Unlike a standard socket implementation, the present embodiment replaces one end-to-end socket connection with two socket connections. Device 510 employs a standard TCP client 530 and server 520 includes a standard TCP server 560. Unlike a standard socket implementation in which client application 530 would be connected to server socket 570, client application 530 is connected to local socket end point 550 (shown as IP address 127.0.0.1 and local port 6789) which is a local TCP server running logic for maintaining a resilient connection, through first (loopback) connection 545, which is then connected through second connection 555 to server socket 570. Connection 555 is maintained by the service running at the local end point 550. As noted above, in the event of a disconnection of connection 555, the service running at the local end point 550 re-establishes connection 555. For example, the service running at 550 may re-establish connection 555 by reconnecting through a different network device and/or protocol, such as switching from cellular to Wi-Fi connectivity.

Accordingly, local end point socket 550 performs as a local proxy server socket, and a client application using the socket service perceives that it is communicating directly with a remote service. This configuration allows standard (and now local) socket connection 545 to appear to be always connected, even if connection 555 becomes disconnected. The client application therefore perceives standard socket connection 545 to be highly resilient. In other words, since connection 545 is not implemented over a remote network, there is no chance of it being disconnected for poor network conditions. It is noted that while the present example illustrates the embodiment in the context of the resilient connection of a computing device (running a client application) to a remote server, the system and method of the present embodiment may be employed to provide a resilient connection between any two computing devices. Furthermore, the resilient socket may be implemented for any one or more of uploading files, downloading files, and communicating in one or more directions.

Figure 7:
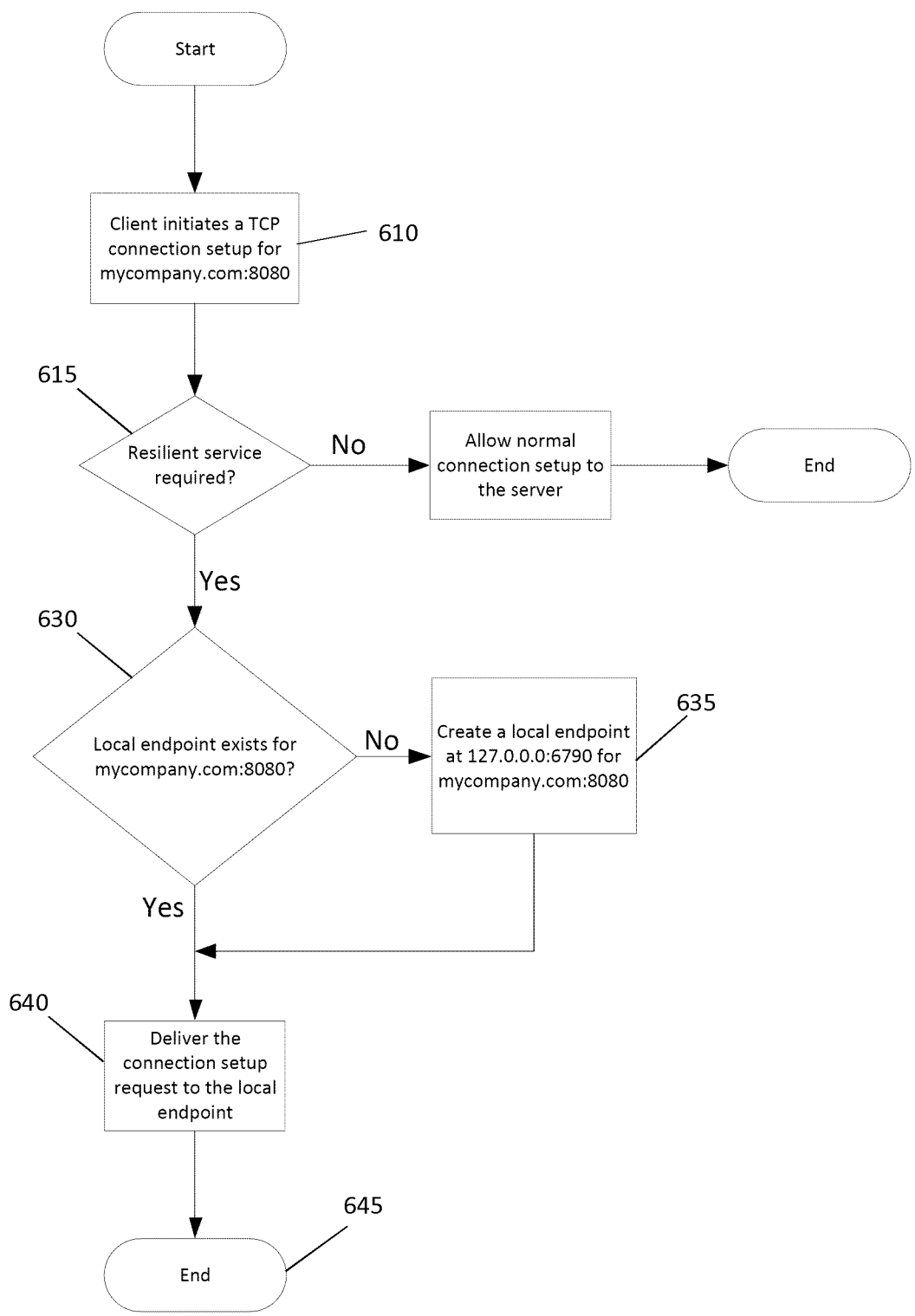
FIG. 7 provides a flow chart illustrating the steps of local endpoint discovery.

FIG. 7 illustrates the steps in configuring local end point 550. A client application employing TCP client application 530 is initially instructed to access the address mycompany.com at port 8080 (e.g. residing on server 520). In steps 610 and 615, it is determined whether or not resilient service is required. If resilient service is required, the resilient socket system maps the remote socket endpoint into a resilient socket endpoint of, for example, 127.0.0.1 and port 6789, at local endpoint 550. This may be achieved, as shown in FIG. 7 in steps 630-640, by first determining if a local endpoint exists for establishing a connection with the internet or IP address and port of the remote server, and if no such endpoint exists, creating the local endpoint.

This local IP address and port is configured by the resilient socket system to communicate with mycompany.com:8080. The client application will thereafter connect with the local endpoint via its standard socket implementation. Although the client application perceives that data is being obtained from local end point 550, this end point merely acts as a proxy for server socket 570, which is the actual source of data.

As illustrated in FIG. 6, only the TCP/IP connection between the local end point 550 and server socket component 570 at mycompany.com goes over a network and is susceptible to disconnection due to poor network condition. If this connection does get disconnected, the resilient socket service running at the local point 550 will reestablish the connection with 570. This connection reestablishment is transparent to the client application 530 and its connection 545 with the local endpoint 550.

Figure 8:
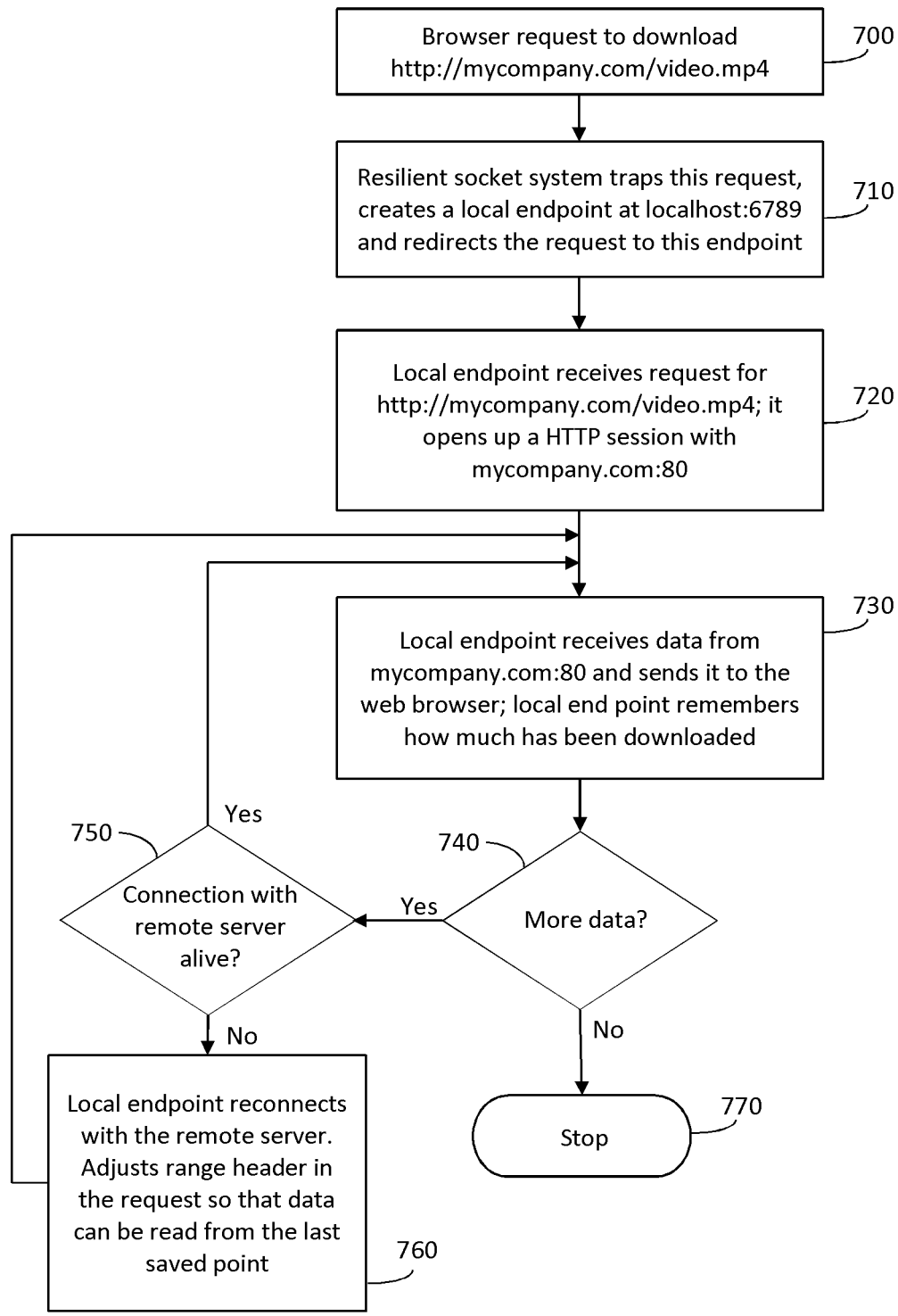
FIG. 8 provides a flow chart describing an example implementation of transferring a file via a resilient socket.

FIG. 8 illustrates the implementation of a resilient socket for HTTP connections, which may be employed, for example, in video streaming applications. HTTP is an important and often used protocol on the internet, and it is very common to download files and stream videos over HTTP, as described above. This present embodiment illustrates how a resilient socket may be employed to provide HTTP resiliency, which may be especially useful for mobile applications.

In step 700 of FIG. 8, a request is made by a user operating a web browser (on a computing device) to download and play a video, which initially resides at remote location http://mycompany.com/video.mp4. The resilient socket system residing on the computing device is employed to capture the request and create a local endpoint at localhost:6789 in step 710. The resilient socket thus directs the download request to this endpoint. In step 720, the local endpoint receives the request for the video download and opens up an HTTP session with mycompany.com:80.

Having made the connection with the remote server (mycompany.com), the local endpoint receives data from mycompany.com:80 in step 730 and sends it to the web browser on the computing device. The resilient socket service running at the local end point records a measure of the amount of the video file that has been downloaded up to each moment in time, which allows for rapid reconnection and continuation of the download in the event of a disconnection. In step 740, provided that a portion of the file remains to be downloaded, it is detected whether or not the connection to the remote server continues to exist in step 750. If the connection remains active, then step 730 is repeated and the download continues directly. However, if the connection has been broken, the resilient socket service running at the local end point reconnects with the remote server in step 760, and adjusts the HTTP range header to the point in the file at which the connection was interrupted. Having re-established the connection and determined the last saved point in the file, the download is continued at step 730. The download is terminated in step 770 when all of the file has been downloaded.

Figure 9:
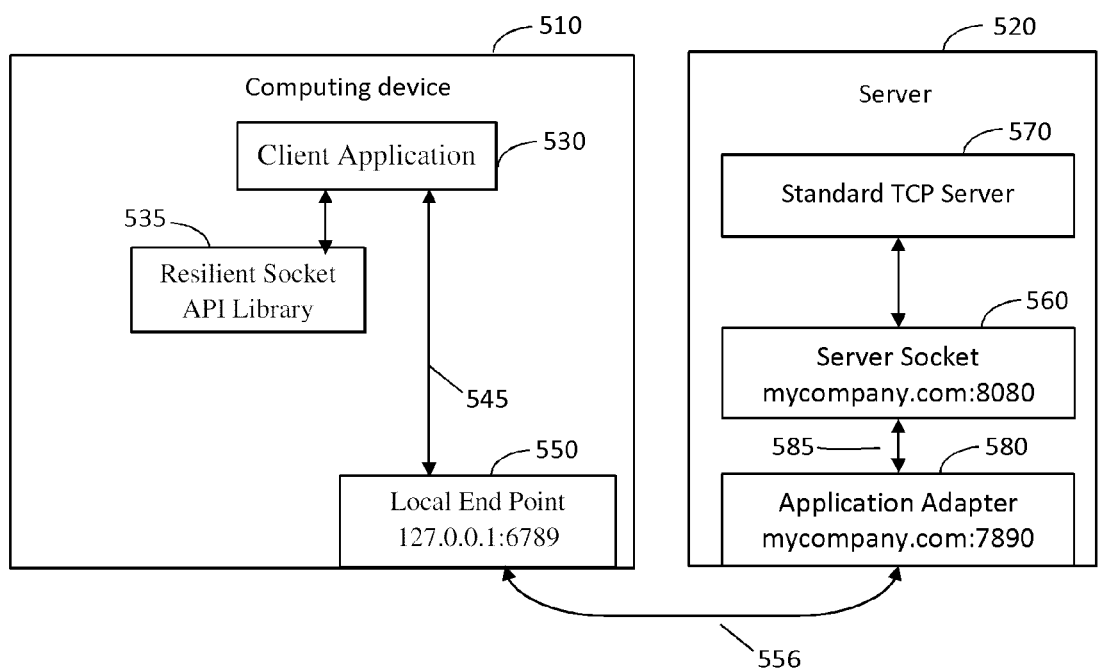
FIG. 9 provides an illustration of an example implementation of a resilient socket with a file server adapter.

The preceding embodiment of implementing a resilient socket may be further configured to include a resilient application adapter for the cases where the remote server application must maintain a steady connection with its client for its operation. An example of such service could be a custom file transfer application where a file must be transferred in its entirety through a steady connection; disconnection would require downloading the file from the beginning. In one embodiment of the resilient system described here introduces resiliency to such fragile services. Referring to FIG. 9, an example implementation is illustrated in which the resilient socket embodiment of FIG. 6 is shown as further including resilient application adapter 580, which connects to remote socket 560 of server 520. Local end point 550 of device 510 connects to application adapter 580 over connection 556.

As shown in the Figure, the application adapter 580 is co-located with the remote server such that the TCP connection 585 between the adapter and the server socket 560 is a loopback connection.

Figure 10:
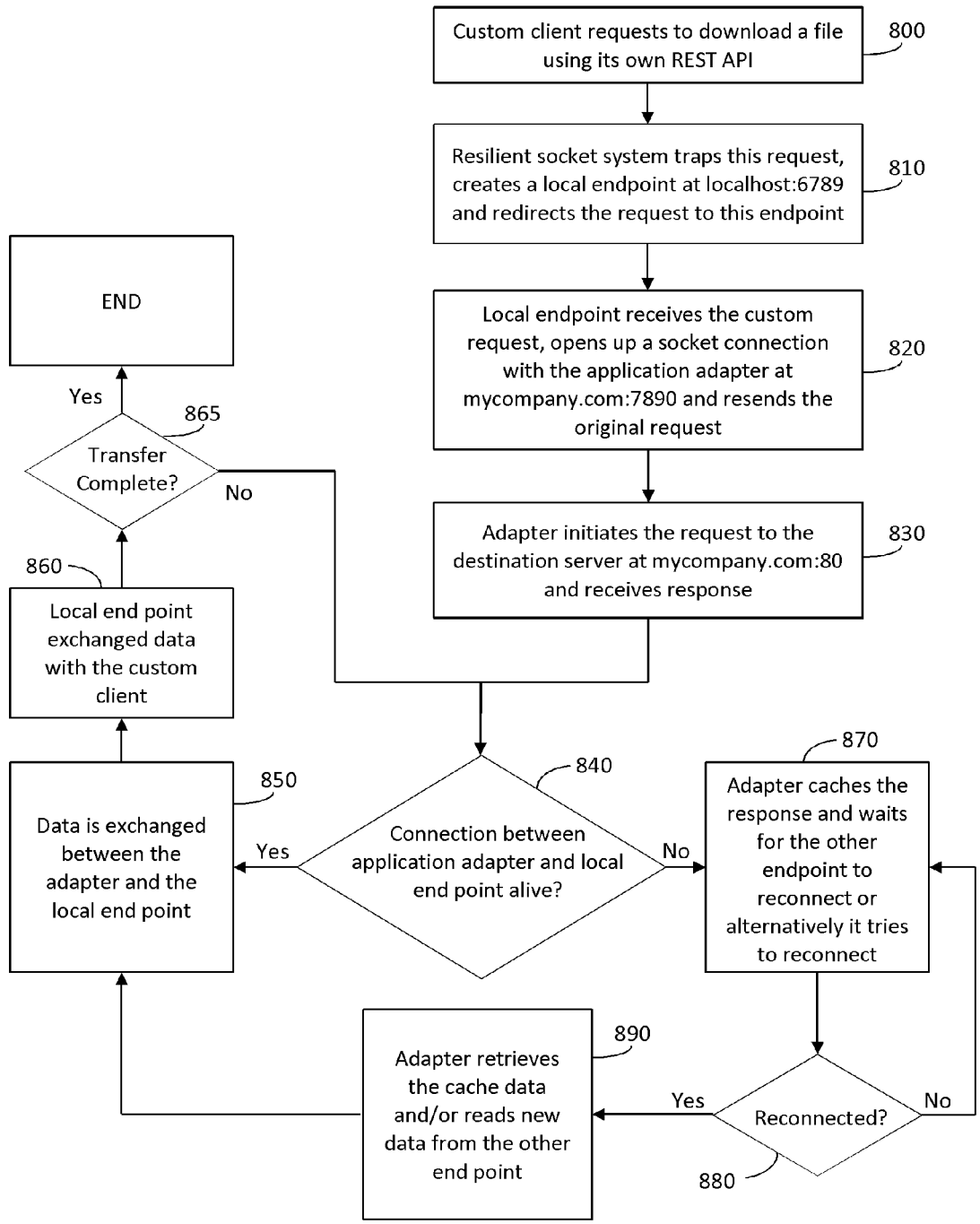
FIG. 10 provides a flow chart illustrating a method of transferring a file from a server to a computing device using a custom application adapter.

FIG. 10 illustrates a method of resiliently downloading a file using a system incorporating both a resilient socket API on the computing device and an application adapter connected to the server as depicted by the system in FIG. 9. In step 800, a custom client issues a custom request to download a file, for example, using its own web services API (example of such a web service request can be made using various web services technology such as REST based API, etc.). The resilient socket system then captures this request in step 810, creates a local endpoint at localhost:6789, and redirects the request to this endpoint. In step 820, the local endpoint receives the custom request, opens up a socket connection with the application adapter at mycompany.com:7890 and resends the original request to the application adapter.

The application adapter initiates the request to the destination server at mycompany.com:80 in step 830, and receives a response. In step 840, a determination is made as to whether or not the connection between the application adapter and the local end point remains alive.

If the connection is alive, then the transfer is continued in steps 850 and 860, where data is exchanged between the application adapter and the local end point, and the subsequently the data is exchanged between the local end point and the custom client. When all data are exchanged the communication ends.

On the contrary, if, when executing step 840, it is determined that the connection between the local endpoint and the application adapted has been severed, step 870 is executed, where the adapter caches the response and waits for the endpoint to reconnect via the resilient socket implemented at the client (alternatively, the application adapter may itself attempt to reconnect with the local endpoint). After having made the reconnection in step 880, the application adapter retrieves the cache data and/or reads new data from the client endpoint to determine the relevant file location at which to re-initiate the download in step 890. After having determined this location, step 850 is implemented to resume the download. This process is continued until the file has been downloaded as determined in step 860 and 865.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A computer implemented method of streaming media on a computing device, the computing device including a streaming client, the method comprising the steps of:

identifying a local streaming adapter and a selected media file for playback on the computing device;

sending a request from the streaming client to the local streaming adapter for playback of the selected media file, identifying a location of one or more stream files on a remote server, wherein the one or more stream files includes the selected media file formatted for delivery according to a transfer protocol and further includes streaming template transactions for supporting communicating from the local streaming adapter to the streaming client;

downloading the one or more stream files to the local streaming adapter; and streaming the selected media file from the local streaming adapter to the streaming client, wherein streaming transactions sent from the local streaming adapter to the streaming client are obtained from the streaming template transactions.

2. The method according to claim 1 wherein the streaming template transactions include transactions that would be sent from a sever to the streaming client under ideal network conditions.

3. The method according to claim 1 wherein the step of identifying a local streaming adapter and a selected media file for playback on the computing device includes the step of receiving, at the streaming client, a link defining the selected media file for playback on the computing device, the link identifying the local streaming adapter for streaming the selected media file.

4. The method according to claim 1 wherein the one or more stream files are a single file.

5. The method according to claim 4 wherein the step of streaming the selected media file from the local streaming adapter to the streaming client comprises the steps of:

receiving one or more streaming protocol requests from the streaming client;

determining and providing a response to each of the one or more streaming protocol requests based on an order of the streaming template transactions; and sending transport data blocks to the streaming client after obtaining a streaming protocol request to play the selected media file.

6. The method according to claim 5 wherein the step of determining and providing the response to each of the one or more steaming protocol requests comprises providing to the streaming client the streaming template transactions as sequentially ordered.

7. The method according to claim 1 further comprising the steps of:

providing a list of media files available on the remote server to a user for selection of the selected media file;

providing the list of media files and a location on the remote server of one or more stream files corresponding to each media file in the list of media files to the local streaming adapter;

wherein the step of identifying a location of one or more stream files on a remote server includes identifying a location on the remote server of one or more stream files corresponding to the selected media file.

8. The method according to claim 7 wherein the steps of providing a list of media files available on the remote server and providing the list of media files and a location on the remote server of one or more stream files corresponding to each media file in the list of media files are performed by a media streaming controller residing on the computing device.

9. The method according to claim 1 further comprising the step of pre-buffering the selected media file at the local streaming adapter prior to streaming the selected media file to the streaming client.

10. The method according to claim 3 wherein the link includes a uniform resource locator identifying the local streaming adapter.

11. The method according to claim 1 wherein the computing device is connected to the remote server through a wireless network.

12. The method according to claim 1 wherein the streaming client is a real-time streaming protocol (RTSP) client, and wherein the transfer protocol is real-time transfer (RTP) protocol.

13. The method according to claim 12 further comprising the step of sending one or more real time transfer control protocol (RTCP) transactions from the local streaming adapter to the streaming client.

14. The method according to claim 13 wherein the RTCP transactions indicate ideal network conditions.

15. The method according to claim 13 further comprising the step of ignoring RTCP transactions sent from the streaming client to the local streaming adapter.

16. The method according to claim 1 wherein the streaming client is a standard RTSP client.

17. The method according to claim 1 wherein the local streaming adapter resides on the computing device.

18. The method according to claim 1 wherein the computing device is a feature phone.

19. The method according to claim 1 wherein the computing device includes an operating system based on a Java™ platform.

20. A method of transcoding a media file for use in locally streaming the media file between a local streaming adapter and a streaming client, wherein the local streaming adapter and the streaming client reside on a computing device, the method comprising the steps of:

transcoding the media file for transport according to a transfer protocol, thereby obtaining a transcoded media file;

generating streaming protocol template transactions for supporting communicating from the local streaming adapter to the streaming client, wherein the streaming protocol template transactions include transactions that would be sent from a streaming sever to the streaming client under ideal network conditions; and storing the transcoded media file and the streaming protocol template transactions on a server, wherein the transcoded media file and the streaming protocol template transactions are made available for downloading by the local streaming adapter.

21. The method according to claim 20 further comprising the step of providing a list of available media files to the computing device.

22. The method according to claim 20 wherein the streaming client is a real-time streaming protocol (RTSP) client, and wherein the transfer protocol is real-time transfer (RTP) protocol.

23. A non-transitory computer-readable storage medium comprising instructions for locally streaming a media file on a computing device, wherein execution of the instructions by one or more processors of the computing device causes the one or more processors to carry out the steps of:

identifying a local streaming adapter and a selected media file for playback on the computing device;

sending a request from a streaming client to the local streaming adapter for playback of the selected media file, identifying a location of one or more stream files on a remote server, wherein the one or more stream files includes the selected media file formatted for delivery according to a transfer protocol and further includes streaming template transactions for supporting communicating from the local streaming adapter to the streaming client;

downloading the one or more stream files to the local streaming adapter; and streaming the selected media file from the local streaming adapter to the streaming client, wherein streaming transactions sent from the local streaming adapter to the streaming client are obtained from the streaming template transactions.

24. A computer implemented method of connecting a first computing device and a second computing device such that an application running on the first computing device perceives the connection as being resilient, the method comprising the steps of:
receiving, on the first computing device, a request from the application to create a connection between the first computing device and the second computing device;
creating a local endpoint socket on the first computing device, such that a first connection is formed between a socket on the first computing device and the local endpoint socket via a loopback connection;
redirecting the request to the local endpoint socket;
establishing a second connection between the local endpoint socket and the second computing device according to the request;
monitoring the second connection; and
in the event of a disconnection of the second connection, reconnecting second connection.

25. The method according to claim 24 wherein the request includes a request to transfer a file between the first computing device to the second computing device.

26. The method according to claim 25 wherein the step of monitoring the second connection further comprises the steps of:
monitoring an amount of the file that has been transferred between the first computing device and the second computing device.

27. The method according to claim 26 wherein the step of reconnecting the second connection further comprises the step of resuming the transfer of the file from the point at which the file transfer had occurred prior to the disconnection of the second connection.

28. The method according to claim 27 wherein the file is transferred between the first computing device and the second computing device in response to an HTTP file request, and wherein the step of resuming the transfer of the file includes adjusting a range header of the HTTP file request.

29. The method according to claim 24 wherein the disconnection occurs due to the disconnection of a first network, and wherein the step of reconnecting the second connection includes the steps of:
identifying a second network suitable for connecting the first computing device to the second computing device; and
connecting the first computing device to the second network;
wherein the application does not perceive the disconnection of the first network and a subsequent connection to the second network.

30. The method according to claim 24 wherein the application is a client application, and wherein second computing device is a remote server, such that the local endpoint socket is a proxy socket for connecting to the server.

31. A non-transitory computer-readable storage medium comprising instructions for connecting a first computing device and a second computing device such that an application running on the first computing device perceives the connection as being resilient, wherein execution of the instructions by one or more processors of the computing device causes the one or more processors to carry out the steps of:
receiving, on the first computing device, a request from the application to create a connection between the first computing device and the second computing device;
creating a local endpoint socket on the first computing device, such that a first connection is formed between a socket on the first computing device and the local endpoint socket via a loopback connection;
redirecting the request to the local endpoint socket;
establishing a second connection between the local endpoint socket and the second computing device according to the request;
monitoring the second connection; and
in the event of a disconnection of the second connection, reconnecting second connection.

32. A computer implemented method of transferring a file from a server to a computing device, the server including an application adapter maintaining a local loopback connection within the server, the method comprising the steps of:
receiving, at the application adapter, a request from the computing device to transfer the file;
providing the request to the server and initiating the transfer of the file from the server to a client application;
monitoring the connection between the application adapter and the computing device;
in the event of a disconnection of the connection, caching a response from the server; and
upon reconnection of the connection between the application adapter and the computing device, retrieving the cached portion of the file and resuming the transfer of the file.

33. The method according to claim 32 wherein the computing device includes a local endpoint socket configured as a proxy for a socket of the server, such that a client application residing on the computing device is connected through a loopback connection to the local endpoint socket, and the local endpoint socket is connected to the application adapter, wherein the request is received from the local endpoint socket.

34. The method according to claim 32 wherein the reconnection of the connection is made by the application adapter, and wherein the application adapter caches the response while re-establishing the connection.

35. The method according to claim 33 wherein the reconnection of the connection is made by the local endpoint socket, and wherein the application adapter caches the response while waiting for the local endpoint socket to re-establish the connection.

36. The method according to claim 32 wherein, in the event of a disconnection of the connection, the file is transferred without interruption from the server to the application adapter.

37. A non-transitory computer-readable storage medium comprising instructions for transferring a file from a server to a computing device, the server including an application adapter maintaining a local loopback connection within the server, wherein execution of the instructions by one or more processors of the computing device causes the one or more processors to carry out the steps of:
receiving, at the application adapter, a request from the computing device to transfer the file;
providing the request to the server and initiating the transfer of the file from the server to a client application;
monitoring the connection between the application adapter and computing device;
in the event of a disconnection of the connection, caching a response from the server; and upon reconnection of the connection between the application adapter and the computing device, retrieving the cached portion of the file and resuming the transfer of the file.

* * * * *